April 7, 1931.  H. T. SEELEY  1,800,032
AUTOMATIC CONTROL EQUIPMENT
Filed Dec. 21, 1929
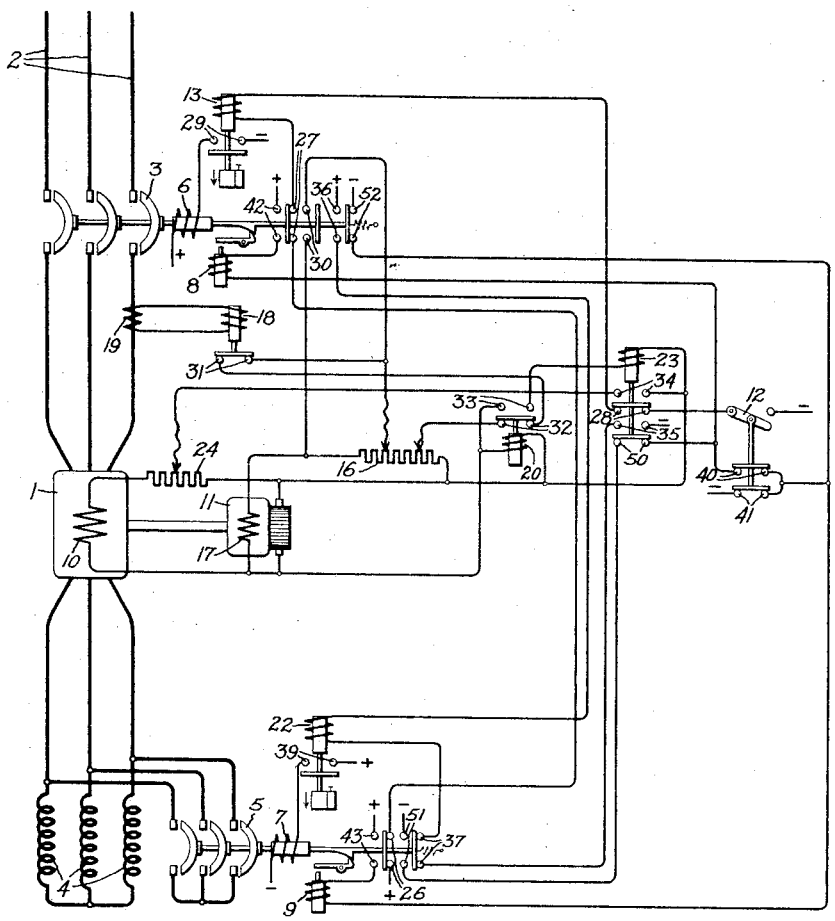
Inventor:
Harold T. Seeley,
by Charles E. Mullan
His Attorney.

Patented Apr. 7, 1931

1,800,032

UNITED STATES PATENT OFFICE

HAROLD T. SEELEY, OF YEADON, PENNSYLVANIA, ASSIGNOR TO GENERAL ELECTRIC COMPANY, A CORPORATION OF NEW YORK

AUTOMATIC CONTROL EQUIPMENT

Application filed December 21, 1929. Serial No. 415,720.

My invention relates to automatic control equipments for dynamo electric machines and particularly to automatic control equipments for starting synchronous machines, and its object is to provide an improved arrangement of apparatus for starting such machines.

In accordance with the preferred embodiment of my invention, the field winding of the synchronous machine is permanently connected to a direct connected exciter, the voltage of which is controlled by the amount of starting current supplied to the motor so that the exciter voltage builds up to its normal value after the machine reaches substantially synchronous speed. When the exciter voltage builds up to its normal value, the normal alternating current running connections of the motor are then established.

My invention will be better understood from the following description when taken in connection with the accompanying drawing, the single figure of which illustrates one embodiment of my invention in connection with an automatic control equipment for a synchronous motor, and the scope of my invention will be pointed out in the appended claims.

Referring to the accompanying drawing, 1 represents a synchronous motor the armature of which is arranged to be connected to a suitable source of alternating current shown as a polyphase supply circuit 2. In order that a relatively low voltage may be impressed across the motor armature to start the motor, suitable switching means 3 is provided which, when closed, connects the motor armature and suitable impedance means such as reactors 4 in series across the supply circuit 2. In order that a relatively high voltage may be impressed across the motor armature after the motor has been started, suitable switching means 5 is provided for short-circuiting the impedance means 4. The switching means 3 and 5 may be of any suitable type, examples of which are well known in the art. As shown in the drawing, the switching means 3 and 5 are circuit breakers of the well known latched-in type and are respectively provided with closing coils 6 and 7 and trip coils 8 and 9.

The synchronous motor 1 is provided with a field winding 10 which is permanently connected across the terminals of a direct connected exciter 11.

In order to start and stop the motor 1, I provide a manually controlled switch 12 which, when closed, effects the starting of the synchronous motor 1 and which, when opened, effects the stopping of the motor. It is to be understood, however, that any other suitable control means, examples of which are well known in the art, may be provided in place of the hand switch 12 to effect the starting and stopping of the motor.

In the particular embodiment of my invention shown in the drawing, the closing of the hand switch 12 effects the energization of a suitable control relay 13, which, in turn, completes an energizing circuit for the closing coil 6 of the circuit breaker 3. The closing of the circuit breaker 3 connects the armature of the motor 1 and the reactors 4 in series across the supply circuit 2 so that a relatively low starting voltage is impressed across the motor armature.

The closing of the switch 3 also effects the completion of a short-circuit around a portion of a resistor 16 in the circuit of the shunt field winding 17 of the exciter 11 so that after the motor 1 has reached synchronous speed and the exciter voltage has built up to its normal value, the exciter field winding 17 is sufficiently energized to maintain the exciter voltage at its normal value. During the starting operation of the motor, however, this amount of resistance in the shunt field circuit is sufficient to delay the building up of the exciter voltage to its normal value until after the motor has reached synchronous speed. In order to accelerate the building up of the exciter voltage after the motor reaches synchronous speed, I provide a relay 18 which is arranged to be energized in response to the starting current supplied to the motor 1. As shown in the drawing, this relay 18 is connected across the secondary winding of a current transformer 19 the primary winding of which is connected in series with the motor armature. When the motor armature current is below a predetermined value, the relay 18 is arranged to complete a short-circuit around another portion of the resistor 16 so that the exciter can build up its voltage more quickly. In order to limit the exciter voltage to its normal value, I provide a voltage relay 20 which is responsive to the exciter voltage and which is arranged to interrupt the short-circuit completed by the current relay 18 as soon as the exciter voltage reaches its normal value.

The operation of the voltage relay 20 also effects the energization of the control relay 22 which, in turn, completes an energizing circuit for the closing coil 7 of the circuit breaker 5 to short circuit the reactors 4. The energization of the control relay 22 in response to the operation of the exciter voltage relay 20 is effected in the embodiment of my invention shown in the drawing by having the voltage relay 20 complete an energizing circuit for a control relay 23, which, in turn, completes an energizing circuit for the control relay 22. The control relay 23 is also arranged to complete a short-circuit around a resistor 24 in the circuit of the motor field winding 10 so that the motor field energization is increased to its normal value. The purpose of having the resistor 24 in the circuit of the motor field winding 10 during the starting operation of the motor is to limit the motor excitation to the proper value to produce the least disturbance on the supply circuit 2 when the motor 1 pulls into step. This value of excitation is usually less than the normal excitation of the motor 1.

The operation of the arrangement shown in the drawing is as follows: When the motor 1 is shut down and the control switch 12 is open the various control devices are in the positions shown in the drawing. When it is desired to start the motor 1, the control switch 12 is operated so that its main contacts complete an energizing circuit for the control relay 13 associated with the circuit breaker 3. The energizing circuit of the control relay 13 is from one side of a suitable control circuit through auxiliary contacts 26 on the circuit breaker 5, auxiliary contacts 27 on the circuit breaker 3, coil of relay 13, contacts 28 of control relay 23, main contacts of control switch 12, to the other side of the control circuit. Control relay 13 by closing its contacts 29 completes an energizing circuit for the closing coil 6 of the circuit breaker 3 so that the armature of the motor 1 and the reactors 4 are connected in series across the supply circuit 2. Since the energizing circuit of the control relay 13 includes auxiliary contacts 26 on the breaker 5 and contacts 28 of the relay 23, it will be seen that the circuit breaker 3 can be closed only when the circuit breaker 5 is open and the control relay 23 is deenergized.

The closing of the circuit breaker 3 impresses a relatively low voltage across the armature of the motor 1 so that the motor starts to operate as an induction motor. The auxiliary contacts 30 on the circuit breaker 3 also completes a short circuit around a portion of the resistor 16 in the circuit of the motor field winding 10.

While the motor 1 is operating below synchronous speed during the starting operation of the motor the starting current supplied to the motor is sufficient to cause the current relay 18 to maintain its contacts 31 open. When however the motor 1 reaches synchronous speed, the current supplied to the motor decreases to a value which allows the relay 18 to close its contacts 31 and thereby complete a short-circuit around another portion of the resistor 16 in the shunt field circuit of the exciter 11. This short circuit also includes contacts 32 of the exciter voltage relay 20.

As soon as the voltage of the exciter 11 builds up to its normal value so that the motor field winding 10 is energized and pulls the motor 1 into step with the supply circuit 2, the exciter voltage relay 20 opens its contacts 32 in the last mentioned short circuit around the resistor 16 and closes its contacts 33 to complete an energizing circuit for the control relay 23. This energizing circuit is from one terminal of the exciter 11 through the winding of the control relay 23, contacts 33 of the voltage relay 20 to the other terminal of the exciter 11. The control relay 23, by closing its contacts 34, completes a short-circuit around a portion of the resistor 24 in the motor field circuit so that the motor excitation is increased to its normal operating value. The control relay 23 by closing its contacts 35, also completes an energizing circuit for the control relay 22 associated with the circuit breaker 5 to effect the closing of this circuit breaker. This circuit is from one side of the control circuit through auxiliary contacts 36 on the circuit breaker 3, winding of relay 22, auxiliary contacts 37 on circuit breaker 5, contacts 35 of relay 23 to the other side of the control circuit. Control relay 22 by closing its contacts 39 completes an energizing circuit for the closing coil 7 of the circuit breaker 5 so that the reactors 4 are short-circuited and the motor armature is connected directly across the supply circuit 2.

The motor 1 is shut down under normal conditions by operating the control switch 12 so that its main contacts are opened and its auxiliary contacts 40 and 41 are closed. The closing of these auxiliary contacts 40 and 41 completes an energizing circuit for the trip coil 8 of the circuit breaker 3 so that the motor 1 is disconnected from the supply circuit 2. This energizing circuit is from one side of the control circuit through auxiliary contacts 42 on the circuit breaker 3, trip coil 8 of the circuit breaker 3, auxiliary contacts 40 and 41 of the control switch 12 to the other side of the control circuit. The closing of the auxiliary contacts 41 also completes an energizing circuit for the trip coil 9 of the circuit breaker 5. This circuit also includes the auxiliary contacts 43 on the circuit breaker 5.

In order to effect the disconnection of the motor 1 from the supply circuit 2 in case the exciter voltage fails for any reason while the motor is in operation, the relay 23 which is controlled by the exciter voltage relay 20 is arranged, when deenergized, to effect the opening of the circuit breaker 3 when the circuit breakers 3 and 5 are closed. The energization of the trip coil 8 which is completed by the control relay 23 is from one side of the control circuit through the auxiliary contacts 42 on the circuit breaker 3, trip coil 8 of the circuit breaker 3, contacts 50 of the control relay 23, auxiliary contacts 51 on the circuit breaker 5 to the other side of the control circuit. As soon as the circuit breaker 3 opens, its auxiliary contacts 52 complete an energizing circuit for the trip coil 9 of the circuit breaker 5. This circuit also includes the auxiliary contacts 43 on the circuit breaker 5.

While I have in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:—

1. In combination, a synchronous motor, an alternating current circuit, means for connecting said motor to said circuit, a direct connected exciter for said motor, and means responsive to the amount of current supplied from said circuit to said motor for increasing the excitation of said exciter when the motor armature current decreases below a predetermined value and means responsive to the exciter voltage for rendering said current responsive means inoperative to increase the exciter excitation when the exciter voltage is above a predetermined value.

2. In combination a synchronous motor, an alternating current circuit, means for connecting said motor to said circuit, a direct connected exciter permanently connected to the field winding of said motor and having a shunt field circuit, a resistor in said shunt field circuit, and means responsive to the current supplied to said motor from said alternating current circuit for completing a short circuit around said resistor when the motor current is below a predetermined value and means responsive to the exciter voltage for opening said short circuit around said resistor when the exciter voltage is above a predetermined value.

In witness whereof, I have hereunto set my hand this 14th day of December, 1929.

HAROLD T. SEELEY.